United States Patent
Weinelt et al.

(10) Patent No.: US 12,187,923 B2
(45) Date of Patent: Jan. 7, 2025

(54) MICHAEL-ADDITION-HARDENING SYNTHETIC RESIN FOR CHEMICAL FIXING TECHNOLOGY

(71) Applicant: fischerwerke Gmbh & Co. KG, Waldachtal (DE)

(72) Inventors: Christian Weinelt, Teningen (DE); Martin Vogel, Waldkirch (DE); Ursula Link-Pfaff, Emmendingen (DE); Hannah Gehring, Waldkirch (DE)

(73) Assignee: fischerwerke Gmbh & Co. KG, Waldachtal (DE)

( * ) Notice: Subject to any disclaimer, the term of this patent is extended or adjusted under 35 U.S.C. 154(b) by 233 days.

(21) Appl. No.: 17/780,987

(22) PCT Filed: Dec. 1, 2020

(86) PCT No.: PCT/EP2020/084011
§ 371 (c)(1),
(2) Date: May 29, 2022

(87) PCT Pub. No.: WO2021/110622
PCT Pub. Date: Jun. 10, 2021

(65) Prior Publication Data
US 2022/0411680 A1   Dec. 29, 2022

(30) Foreign Application Priority Data

Dec. 4, 2019 (DE) ...................... 10 2019 133 063.7
Nov. 2, 2020 (DE) ...................... 10 2020 128 717.8

(51) Int. Cl.
*C09J 165/00* (2006.01)
*F16B 13/14* (2006.01)

(52) U.S. Cl.
CPC ........... *C09J 165/00* (2013.01); *F16B 13/142* (2013.01)

(58) Field of Classification Search
CPC ............................. C09J 165/00; F16B 13/142
See application file for complete search history.

(56) References Cited

U.S. PATENT DOCUMENTS

| | | | |
|---|---|---|---|
| 4,217,396 A | 8/1980 | Heckles | |
| 4,602,061 A | 7/1986 | Akkerman | |
| 2005/0081995 A1 | 4/2005 | Beckley et al. | |
| 2016/0159689 A1 | 6/2016 | Burgel et al. | |
| 2017/0313907 A1 | 11/2017 | Cotsakis et al. | |
| 2018/0134913 A1 | 5/2018 | De Wolf et al. | |

FOREIGN PATENT DOCUMENTS

| | | | | |
|---|---|---|---|---|
| DE | 4111828 A1 | 10/1992 | | |
| DE | 102015003221 A1 * | 10/2015 | ............. | C04B 26/06 |
| EP | 1462501 A1 * | 9/2004 | ........... | C09D 175/16 |
| EP | 1647588 A2 | 4/2006 | | |
| EP | 2357162 A1 | 8/2011 | | |
| EP | 2829524 A1 | 1/2015 | | |
| EP | 3299432 A1 | 3/2018 | | |
| WO | 2016/166361 A1 | 10/2016 | | |

OTHER PUBLICATIONS

International Search Report for corresponding Application No. PCT/EP2020/084011, mailed Mar. 5, 2021.
Written Opinion for corresponding Application No. PCT/EP2020/084011, mailed Mar. 5, 2021.
German Search Report for corresponding Application No. 10 2019 133 064.5, dated May 28, 2020.
International Preliminary Report on Patentability and Written Opinion corresponding to Application No. PCT/EP2020/084010 mailed May 17, 2022.

* cited by examiner

*Primary Examiner* — Daniel McNally
(74) *Attorney, Agent, or Firm* — Renner, Otto, Boisselle & Sklar, LLP

(57) ABSTRACT

Use of a synthetic resin system as an adhesive for chemical fixing technology, especially for fixing anchoring means in drilled holes, which synthetic resin system includes a) a reaction resin based on α, β-unsaturated compounds, b) a reaction resin based on compounds that include CH-acidic methylene groups, and c) a catalyst, and to related subject matter.

13 Claims, No Drawings

MICHAEL-ADDITION-HARDENING SYNTHETIC RESIN FOR CHEMICAL FIXING TECHNOLOGY

TECHNICAL FIELD

The invention relates to a synthetic resin system for chemical fixing technology, especially for fixing anchoring means in drilled holes, which system includes a reaction resin based on $\alpha,\beta$-unsaturated compounds, a reaction resin based on compounds that include CH-acidic methylene groups, and a catalyst, and to the use thereof and to further aspects (embodiments) of the invention mentioned hereinbelow.

DISCUSSION OF THE RELATED ART

In the field of chemical fixing technology, primarily two different systems have become established: a system based on free-radical-polymerisable, ethylenically unsaturated compounds, which is hardened by means of peroxides, and a system based on epoxy/amine. Both systems have advantages and disadvantages. Free-radical-hardening systems are distinguished by rapid low-temperature hardening (for example: −10° C.), but exhibit relatively high shrinkage and not very high pull-out values. On the other hand, epoxy/amine-based systems have a significantly slower hardening speed at low temperatures (for example: <+5° C.), but they exhibit considerably less shrinkage and significantly higher pull-out values.

Efforts have long been made to combine the advantages of both systems in the field of chemical fixing technology. For that purpose, dual-hardening binders have been proposed in the past which cure both by free-radical polymerisation and by polyaddition (epoxy/amine). This means that such hybrid systems are based on resin compositions that contain compounds which are hardenable by two different types of reaction. For example, EP 2 357 162 A1 describes a hybrid resin system which contains a free-radical-hardenable resin and an epoxy resin. The hardeners contain an aliphatic amine and a peroxide, especially a perester. A disadvantage of such a hybrid system is that it cannot be provided in a storage-stable form, especially as a two-component system. This is because the peresters, on account of their reactive carbonyl group, rapidly react with amines.

The problem of the present invention is to provide a synthetic resin system that combines rapid low-temperature hardening, as in the case of free-radical-polymerisable systems, with significantly higher pull-out values, as in the case of polyaddition-hardening systems (epoxy/amine).

A further problem for preferred aspects of the present invention is the provision of a fixing composition in the form of a synthetic resin system which avoids ingredients posing a high risk to health and which is preferably non-hazard classified.

Surprisingly it has been found that it is possible to achieve the advantages of previous systems if—departing from the conventional types of polymerisation—use is made of a synthetic resin system which includes the starting materials for a Michael addition (C-Michael addition).

Michael-addition-hardening systems are known from the field of floor coatings. For example, US 2018/0134913 A1 describes a coating that includes a CH-acidic compound as component A and an activated $\alpha,\beta$-unsaturated compound as component B. Both components cure in the presence of a strong base. The crosslinking index of floor coatings according to the invention is from 2.4 to 2.8.

U.S. Pat. No. 4,217,396 also describes crosslinked acrylate/acetoacetate polymers for use as a floor coating. The acetoacetates used are exclusively diacetoacetates which, in combination with polyfunctional acrylates, form the floor coating. The crosslinking index used in the Examples is 2.9.

U.S. Pat. No. 4,602,061 describes a room-temperature-hardenable paint composition which consists of an $\alpha,\beta$-unsaturated carbonyl compound and a compound having activated CH groups (such as malonate-group-containing oligomeric or polymeric esters). The paint composition hardens rapidly and without supply of heat and has excellent hardness. The crosslinking indices used in the compositions are in the range from 2.0 to 2.7.

American patent application US 2005/0081995 A1 is based on an adhesive composition which consists of at least one Michael donor, at least one Michael acceptor and at least one anion of a Michael donor. The adhesive composition is used for the production of adhesive strips and has a crosslinking index in the range from 2.0 to 2.2.

SUMMARY OF THE INVENTION

The subject matter of the invention in a first embodiment of the invention is a synthetic resin system which comprises the following constituents:
 a) reaction resin based on $\alpha,\beta$-unsaturated compounds,
 b) reaction resin which includes compounds carrying CH-acidic methylene groups, and
 c) a catalyst.

The synthetic resin system is preferably implemented in multi-component form, especially two-component form, preferably in the form of a multi-component kit, such as a two-component kit.

In a further embodiment, the invention relates also to the use of a multi-component synthetic resin system, especially a two-component synthetic resin system, composed as just described, as an adhesive, especially for fixing anchoring means in substrates, such as masonry or concrete, or, furthermore, for fixing fibres, laid fabrics, woven fabrics or composites for reinforcement of built structures.

Corresponding processes and methods for mortar-bonded fixing of anchoring elements in holes or crevices, wherein a multi-component synthetic resin system, especially a two-component synthetic resin system, according to the invention is used for mortar-bonded fixing (adhesively bonded fixing) of anchoring means, the synthetic resin system and an anchoring means being introduced one after the other, especially first the synthetic resin system and then the anchoring means, or (at least substantially) simultaneously into a hole or crevice in a substrate (including in a cracked substrate, such as in cracked concrete), or mixed forms with partial introduction in each case, also form an embodiment of the invention.

Embodiments of the invention will also be found in the claims which are incorporated herein by reference.

DETAILED DESCRIPTION OF THE INVENTION

The inventors have surprisingly discovered that a synthetic resin system based on constituents a), b) and c) combines the advantages that are to be found, on the one hand, in free-radical-hardening chemical fixing systems and, on the other hand, in chemical fixing systems that harden by polyaddition, although no free-radical hardening is involved. This is surprising insofar as the reactions taking place here have never hitherto been used in a synthetic resin system for chemical fixing technology.

Michael addition is known from the field of coatings, especially for floor coatings (see the corresponding patent specifications mentioned above). Since the forces arising in the drilled hole are entirely different from those of a (floor) coating, it was not obvious for the skilled person in the field of fixing technology for anchoring means to consider Michael addition between α,β-unsaturated compounds and compounds carrying CH-acidic methylene groups for use as a synthetic resin system for chemical fixing systems. For example, in the drilled hole—considered macroscopically—axial loading gives rise to enormous shear stresses which the system has to withstand, whereas a (floor) coating should rather withstand high compressive strengths and abrasion resistances.

The inventors have surprisingly also discovered that a synthetic resin system based on a Michael addition exhibits high performance in the drilled hole also when highly functionalised starting materials are used. The inventors have also ascertained that as the crosslinking index increases, the pull-out values from concrete also increase. This is surprising insofar as European patent application EP 3 299 432 A1, pages 2 and 3, teaches that as the proportion of functional groups (here(meth)acrylate groups) increases, the polymerisation shrinkage increases and as a result the load-bearing behaviour of the chemical bond anchor is significantly impaired.

The subject matter of the invention in a further embodiment of the invention is a synthetic resin system which comprises the following constituents:
a) reaction resin based on α,β-unsaturated compounds having an average functionality 2,
b) reaction resin which includes compounds carrying CH-acidic methylene groups having an average functionality 4, and
c) a catalyst.

It has also been found that the problem according to the invention can be solved especially satisfactorily if the crosslinking density for the cured product is based on a crosslinking index in the region of 3.0 or more, the crosslinking index IV generally being determined in accordance with the following formula:

$$IV = \frac{\sum (ni(Ai) * fi)}{\sum (ni(Ai))} \quad \text{(equation A)}$$

wherein

Ai denotes the nature of the particular group in a constituent (for example a), b)) that participates in a polymerisation, for example —$CH_2$-(functionality 2), —$CH$=$CH_2$, or the like, ni denotes the quantity (number) of corresponding groups of the molecule i in the total system and fi denotes the particular functionality (which in the case of mixtures may be the average functionality) of the reactive molecules, taking into account the number of possible reactions with a potential reactant, in each case with the proviso that in the case of two-component or multi-component systems the components (for example a):b) in the case of a two-component system) are present in stoichiometric ratios, so that according to the invention the quantity of excess reactive groups of a component should preferably deviate from the stoichiometrically correct amount by not more than 20%, preferably by less than 10%, more preferably by less than 0.5%, and complete reaction being assumed.

The crosslinking index IV is accordingly a dimensionless quantity and gives only an average number. If IV=2 or less, only linear polymers are present, while if IV is greater than 2, the crosslinking to form thermosets begins, as required according to the invention in order to ensure high performance in the drilled hole and thermal stability.

The crosslinking index is accordingly also a theoretically determined (average) value which is obtained from the data Ai, ni and fi or corresponding data for the starting materials (which, for example, are commercially available with corresponding data or are obtainable or deter-minable in accordance with customary methods for determining reactive groups known to the person skilled in the art). It will be readily evident to the person skilled in the art that by mixing compounds having different functionalities in suitable ratios to one another it is possible to achieve an extremely wide range of crosslinking indices (see also the above formula).

The subject matter of the present invention in a further embodiment of the invention is accordingly a synthetic resin system which comprises the following constituents:
a) reaction resin based on α,β-unsaturated compounds having an average functionality 2,
b) reaction resin which includes compounds carrying CH-acidic methylene groups having an average functionality 4, and
c) a catalyst,
characterised in that the crosslinking index of the synthetic resin system is 3.

Furthermore, it has been found that a synthetic resin system based on constituents a), b) and c) meets the criteria applicable for usability under building site conditions. Those criteria are inter alia, on the one hand, sufficient stability at high temperatures (<45° C.) in order to prevent dripping and/or running out of the drilled hole, and, on the other hand, sufficiently low viscosity at low temperatures (>−25° C.) in order to ensure it can be squeezed out of cartridges or the like by hand.

Hereinabove and hereinbelow, one, some or all relatively general terms or features can be replaced in each case by more specifically mentioned definitions (especially those mentioned hereinbelow), resulting in specific, especially preferred, embodiments of the invention.

Where "a" or "an" is used, this is to be primarily understood (unless otherwise apparent, for example by being preceded by "at least") as the indefinite article and includes "one (in FIG. 1) or more" and also just one (in FIG. 1). In other words, "a" or "an" means "one (1)" or "one or more, for example two or three or four".

Proportions or contents given in percent hereinabove and hereinbelow refer in each case to percent by weight ("% by weight") or the relative proportion by weight, unless otherwise indicated, relative to all ingredients of a synthetic resin system according to the invention (excluding packaging material), unless otherwise indicated or apparent.

"Include" or "comprise" means that other components or features may be present in addition to the components or features mentioned and therefore does not refer to an exhaustive list, unlike "consist(ing) of", the use of which does signify an exhaustive list of components or features. In embodiments of the invention, "include" or "comprise" can be replaced by "consist(ing) of".

Where the attribute "furthermore" is mentioned, this means that features without this attribute can be more preferred.

"And/or" means that the mentioned features/substances can in each case be present on their own or in a combination of two or more of the individually mentioned features/substances.

In constituent a) of the synthetic resin system according to the invention, the average functionality of the α,β-unsaturated compounds is 2, especially 2 to 20 or preferably to 18, especially from 2.05 to 20 or preferably to 18, preferably from 2.1 to 20.

In constituent b) of the synthetic resin system according to the invention, the average functionality of the compound carrying CH-acidic methylene groups is 4, especially 4 to 12, preferably to 7, especially from 4.05 to 12, preferably to 7, preferably from 4.1 to 12, preferably to 7.

The crosslinking index of the synthetic resin system is 3, preferably 3 to 6, especially from 3.1 to 6, more preferably from 3.5 to 6, very preferably from 4 to 6, more especially from 4.1 to 4.3.

A reaction resin based on α,β-unsaturated compounds can include as α,β-unsaturated compound generally an ethylenically unsaturated compound in which the carbon double bond has been activated by an electron-attracting group (for example a carbonyl group in α-position). Such a reaction resin is especially to be understood as being one that comprises or (considered on its own as a reaction resin) consists of a compound that carries at least one, preferably two or more, fumarate, maleate, itaconate or especially acrylate group(s) ($H_2C=CH-CO-$), such as an acrylic acid ester or acrylamide, such as a mono- or especially di-, tri-, tetra- or higher polyacrylate, especially selected from hydroxy-$C_2$-$C_{10}$alkyl-acrylate, such as hydroxyethyl, hydroxypropyl or hydroxybutyl acrylate, ethanediol diacrylate, 1,3-propanediol diacrylate, 1,4-butanediol acrylate, poly(butanediol)diacrylate, polybutadiene diacrylate, 3-methyl-1,5-pentanediol diacrylate, 1,6-hexanediol diacrylate, diethyleneglycol diacrylate, tetraethyleneglycol diacrylate, tripropyleneglycol diacrylate, triethyleneglycol diacrylate, triisopropyleneglycol diacrylate, dipropyleneglycol diacrylate, neopentylglycol diacrylate, ethoxylated or propoxylated neopentylglycol diacrylate, tripropyleneglycol diacrylate, bisphenol-A-, bisphenol-F-, bisphenol-AF- or bisphenol-S-diglycidyl ether diacrylate, bisphenol-A-polyethoxydiacrylate, bisphenol-F-polyethoxydiacrylate, polyethyleneglycol diacrylates, polypropyleneglycol diacrylate, trimethylolpropane triacrylate, di-trimethylol-propane tetraacrylate, trimethylolpropane polyethoxytriacrylate, ethoxylated or propoxylated trimethylolpropane triacrylate, glycerol triacrylate, ethoxylated or propoxylated glycerol triacrylate, tris(2-acryloxyethyl) isocyanurate, pentaerythritol triacrylate, pentaerythritol monohydroxytriacrylate, pentaerythritol triethoxytriacrylate, pentaerythritol tetraacrylate, ethoxylated or propoxylated pentaerythritol tetraacrylate, ditrimethylolpropane tetraacrylate, dipentaerythritol pentaacrylate, dipentaerythritol polyhexanolide hexaacrylate, dipenta-erythritol hexaacrylate, tris(hydroxyethyl) isocyanuratopolyhexanolide triacrylate, tris(2-hydroxyethyl)isocyanuratotriacrylate, tricyclodecanedimethylol diacrylate, esterdiol diacrylate, 2-(2-acryloyloxy-1,1-dimethyl)-5-ethyl-5-acryloyloxymethyl-1,3-dioxane, tetrabromobisphenol-A-diethoxydiacrylate, 4,4-dimercaptodiphenylsulfide diacrylate, polytetraethyleneglycol diacrylate, 1,9-nonanediol diacrylate, 1,10-decanediol diacrylate, dimethylolpropane tetraacrylate, cresol epoxyacrylates, novolak "poly"acrylate, acrylate-group-containing oligomers or polymers from the reaction of polyepoxides with acrylic acid (or reactive derivatives thereof, such as acid halides or active esters) or from the reaction of polyester polyols with acrylic acid (or reactive derivatives thereof, especially as just mentioned), or urethane acrylates (obtainable, for example, by reaction of isocyanates with an OH-group-containing acrylate, such as hydroxyethyl-, hydroxypropyl-, hydroxybutyl- or pentaerythritol-tri-acrylate, and polyester acrylate resins, for example tetrafunctional polyester acrylates). Also possible are acrylic-functional alkoxysilanes or organopolysiloxanes (see WO2006/087079 A1), such as acrylatomethyl-trimethoxysilane, -methyldimethoxy-silane, -dimethylmethoxy-silane, -triethoxysilane or -methyldiethoxysilane, acrylamidomethyl-trimethoxysilane, -methyl-dimethoxysilane, -dimethylmethoxysilane, -triethoxysilane, -methyldiethoxysilane, or -methyl-dimethylethoxysilane.

Alternatively, a reaction resin based on α,β-unsaturated compounds can also be understood as being a polyester resin based on maleic, fumaric or itaconic acid, or the respective anhydride thereof. Furthermore, polyester, polyurethane, polyether and/or alkyd resins that carry activated, ethylenically unsaturated groups are also to be understood as being such reaction resins. Acrylates (especially preferred), fumarates, itaconates and maleates, especially those characterised as being preferred in the present disclosure, are preferred reaction resins.

The said compounds can also be present as mixtures of two or more thereof.

Monoacrylates are also possible. They are less preferred, however, on account of their chain-terminating action or are present as additives to di- or poly-acrylates. Commercially available acrylates and/or fumarates, maleates or itaconates can be used. Monoacrylates that may be mentioned by way of example are tetrahydrofurfuryl acrylate, 2-phenoxyethyl acrylate, isobornyl acrylate and/or cyclic trimethylolpropane formalacrylate. More preferred monoacrylates include acrylated amines, obtainable, for example, from Sartomer. The mono-acrylates, -fumarates, -maleates and/or -itaconates can also be mixed with di- or poly-acrylates, -fumarates, -maleates and/or -itaconates.

Preferred compounds of this category also include α,β-unsaturated compounds having biogenic content (characterisable by the $^{14}0$ content which, relative to the total carbon content, is higher than in the case of fossil substances), that is to say especially those which have been functionalised by (preferably biogenic) acrylic acid, for example via OH or, furthermore, SH or amino ($NH_2$) or imino ($-NH$) groups present in the (preferably likewise biogenic) complementary starting materials (raw materials) (with at least some of the acrylic acid and/or the complementary starting materials being biogenic), or two or more of those groups, especially those which contain hydroxy groups and have thus been functionalised to (correspondingly wholly or at least partly biogenic) acrylic acid esters, such as, for example, acrylates (preferably having biogenic acrylate content) of hydroxy-group-containing vegetable oils, such as of castor oil or soybean oil, wholly or at least partly biogenic (for example $C_1$-$C_{10}$)alkan(mono-, di-, tri-, tetra-, penta- or hexa- or poly-)ol acrylates, partly or preferably wholly biogenic polyglycerol acrylates, wholly or partly biogenic acrylates of sugar alcohols, such as mannitol, xylitol or sorbitol, wholly or partly biogenic acrylated fusel oils, wholly or partly biogenic 5- or 6-membered-ring heterocyclyl acrylates (especially having one or two hetero atoms selected from O, N and S in the ring), or partly or preferably wholly biogenic glycerol or polyglycerol acrylates, wholly or partly biogenic saccharide acrylates. Special preference is given to epoxidised soybean oil acrylate, 1,10-decanediol diacrylate, tetrahydrofuryl acrylate, isobornyl acrylate, sorbitol acrylate, lauryl (meth)acrylate, behenyl acrylate, propoxylated glycerol triacrylate, pentaerythritol triacrylate, pentaerythritol tetraacrylate, di-pentaerythritol pentaacrylate, tetrahydrofurfuryl methacrylate, polyethyleneglycol dimethacrylate, polyester acrylates, acrylated fusel oil, or biogenic glycerol triacrylate or one in which at least the acrylate content is biogenic. Special preference is likewise given to biogenic urethane acrylates (obtainable, for example, by reaction of isocyanates (such as, for example: Desmodur Eco N 7300) with an OH-group-containing acrylate, such as hydroxyethyl-, hydroxypropyl-, hydroxybutyl- or pentaerythritol-tri-acrylate, and polyester acrylate resins, for example tetrafunctional polyester acrylates).

The content of biobased carbon is determined via the $^{14}C$ content on the basis of ASTM 6866 (Standard Test Method for Determining the Biobased Content of Solid, Liquid and Gaseous Samples Using Radiocarbon Analysis (ASTM International, D6866:2008, Method A).

Where reference is made to acrylates hereinabove and hereinbelow, this includes, furthermore, alternatively or in combination also the corresponding methacrylates (to be realised in more specific cases by insertion of "meth" before "acrylate").

A mixture of two or more α,β-unsaturated compounds (especially those mentioned above) is also possible.

The proportion of the reaction resin based on α,β-unsaturated compounds is preferably from 1 to 80% by weight, especially from 2 to 60% by weight.

A reaction resin that includes compounds carrying (one or more) CH-acidic methylene groups (activated methylene groups) is especially to be understood as one comprising malonic acid or malonic acid esters, such as malonic acid dimethyl ester, malonic acid diethyl ester, malonic acid di-n-propyl ester, malonic acid diisopropyl ester, malonic acid dibutyl ester, malonic acid di-(2-ethylhexyl) ester or malonic acid dilauryl ester; cyanoacetic acid esters, such as 2-ethylhexyl cyanoacetate, butyl cyanoacetate, octyl cyanoacetate, 2-methoxyethyl cyanoacetate; diones, such as pentane-2,4-dione, hexane-2,4-dione, heptane-2,4-dione, 1-methoxy-2,4-pentanedione, 1-phenyl-1,3-butanedione, 1,3-diphenyl-1,3-propanedione, 4,6-dioxoheptanoic acid methyl ester, 5,7-dioxooctanoic acid methyl ester; acetoacetates, such as benzoylacetoacetic acid methyl, ethyl or butyl ester, propionylacetic acid methyl, ethyl or butyl ester, butyroylacetic acid methyl ester, acetoacetic acid methyl, ethyl, isopropyl, n-butyl, isobutyl or tert-butyl ester, acetoacetic acid (2-methoxyethyl) ester, acetoacetic acid (2-ethylhexyl) ester, acetoacetic acid lauryl ester, 2-acetoacetatoethyl acrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, free or ethoxylated bisphenol-A-, -F-, -AF- or -S-diacetoacetate, trimethylolpropane triacetoacetate, pentaerythritol tri- or tetra-acetoacetate, ditrimethylolpropane tetraacetoacetate, di pentaerythritol hexaacetoacetate, acetoacetate-group-carrying oligomers or polymers which are obtainable, for example, by transesterification of acetoacetic acid (for example ethyl) esters, acetoacetategroup-carrying oligomers or polymers which are obtainable by copolymerisation of acetoacetoxyethyl methacrylate, oligomers or polymers which are obtainable from dialkyl malonates and diols, or acetoacetylated novolaks, or a mixture of two or more thereof.

Very especially preferably, the reaction resin carrying CH-acidic methylene groups is an acetoacetate having at least two or more acetoacetate groups. As already indicated above (in the list of possible compounds given purely by way of example) the acetoacetates can be aliphatic, heteroaliphatic, cyclic, heterocyclic, cycloaliphatic and/or araliphatic.

The proportion of CH-acidic compound(s) is preferably from 1 to 80% by weight, especially from 2 to 60% by weight.

A mixture of two or more CH-acidic compounds (especially those mentioned above) is also possible.

CH-acidic compounds having methylene groups (—$CH_2$—), because they carry two hydrogen atoms, are to be regarded as mono- or di-functional. For the Michael addition and the calculation of the crosslinking index, the methylene groups are to be regarded as difunctional.

As catalyst for a synthetic resin system according to the invention, one (or two or more) catalysts selected from the following can advantageously be present:

Strongly basic catalysts (especially having a pKa of 11 or more), such as alkali metal hydroxides (for example sodium or potassium hydroxide), alkali metal alkoxides (for example sodium or potassium (m)ethoxide), quaternary ammonium compounds (for example tetra-butylammonium hydroxide, benzyltrimethylammonium hydroxide, tetrabutylammonium carbonate), tertiary amines (for example diazabicyclooctane (also referred to as DABCO) and guanidines/amidines (for example tetramethylguanidine, 1,8-diazabicyclo[5.4.0]undec-7-ene, 1,5-diazabicyclo[4.3.0]non-5-ene), silicates (for example sodium silicate) and metal oxides (for example calcium oxide); phosphine catalysts, for example tricyclohexylphosphine (especially preferred), tricyclopentylphosphine, tri-n-hexylphosphine, tris(2,4,4-trimethyl-pentyl)phosphine, tris(2-ethylhexyl)phosphine, tri-n-octylphosphine (especially preferred), tri-n-decylphosphine, tri-n-dodecylphosphine (especially preferred), tristearylphosphine and triphenylphosphine.

A further suitable catalyst (obtained after mixing of the components of a synthetic resin system according to the invention) is a mixture of an epoxide (having epoxy groups as glycidyl esters (preferably as low molecular weight glycidyl esters), glycidyl ethers, such as the diglycidyl ether of bisphenol A, or epoxidation products of alpha-olefins) with one or more tertiary amines (especially triethylenediamine, Mannich reaction products, or the acrylated amines already mentioned above (obtainable from Sartomer)), as described in EP 0 326 723 (also referred to hereinbelow as epoxy/tert-amine catalysts). The epoxide can advantageously be present in the component with the α,β-unsaturated compound or the CH-acidic compound or both, and the tertiary amine can be present in the component with the α,β-unsaturated compound. Salts of strong bases (or small amounts of the strong bases themselves), such as tetramethylguanidine, DABCO (1,8-diazabicyclo(5.4.0)undec-7-ene) or quaternary ammonium hydroxides can additionally be added, for example distributed in such a way that the strong base moiety is present in one component (preferably not the component with the CH-acidic compound), and the epoxide is present in a different component. The constituents react on mixing and form a strong catalytically active base.

Possible catalysts are, furthermore, carbon-dioxide-blocked strong bases, such as quaternary alkylammonium bicarbonates or alkyl carbonates, which are, however, less preferred because they release $CO_2$, except for applications where this is not troublesome or is even desirable, for example thermally insulating coatings.

It is also possible for two or more of the mentioned catalysts to be present.

The catalysts are preferably added in amounts of from 0.01 to 15% by weight, especially from 0.1 to 10% by weight.

A multi-component kit (or set) is especially to be understood as being a two-component kit, (preferably a two-component kit), preferably a two-chamber device or, furthermore, a multichamber device, in which the constituents that are capable of reacting with one another are contained in such a way that they cannot lead to undesired reactions during storage, preferably in such a way that the constituents that react with one another cannot come into contact with one another prior to use. Capsules are a possibility. Especially suitable, however, are cartridges or foil pouches having two or, furthermore, more chambers, or containers such as buckets or tubs having a plurality of chambers or sets (for example packs) of two or more such containers, wherein two or more components of the particular hardenable synthetic resin system, especially two components, are present physically separate from one another in the form of a kit or set, in which case the contents, after being mixed together or while being mixed together, are applied to the site of use (especially by means of application devices, such as trowels or brushes or a static mixer), for example to a surface for fixing fibres, laid fabrics, woven fabrics, composites or the like, or especially to a recess, preferably a drilled hole, especially for fixing anchoring means such as anchor rods or the like; and also multi-component cartridges or, especially, two-component cartridges, the chambers of which contain the plurality of components or preferably two components for a synthetic resin system according to the invention especially for fixing purposes having the constituents mentioned hereinabove and hereinbelow for storage prior to use, the kit in question preferably also including a static mixer. In the case of the foil pouches and the multi-component cartridges, the multi-component kit can also include a discharge device (for example an applicator gun), but this can preferably also (for example for multiple use) be packaged and sold independently of the kit.

The reactive constituents of a synthetic resin system according to the invention (to be understood as meaning primarily constituents a), b) and c)) are divided between the components of the multi-component system, especially the multi-component kit, in such a way that constituents that react with one another do not come into contact with one another prior to use (especially during manufacture, storage and transport) (the constituents are separated from one another so as to inhibit reaction). Appropriate divisions will be readily evident to the person skilled in the art.

In a possible preferred variant of a multi-component kit according to the invention, constituents a) and b) are present in one component (K1), while constituent c) is present on its own or together with a non-reactive solvent/diluent/plasticiser and/or adhesion promoter in a different component (K2) (which component is not capable of mixing, that is to say is kept separate, in the stored state), it being optionally possible in each case for one or more further additional ingredients to be present.

If the catalyst is an epoxy/tert-amine catalyst, this is also divided between the two components. In that case, in a possible preferred variant of a multi-component kit according to the invention constituents a), b) and the epoxy moiety of an epoxy/tert-amine catalyst are present in one component (K1), and constituent c) is present together with the tert-amine moiety of an epoxy/tert-amine catalyst in a different component (K2), it likewise being optionally possible in each case for one or more further additional ingredients to be present.

In addition to the constituents already mentioned, a synthetic resin system according to the invention preferably comprises one or more further additives, especially selected from fillers, rheology aids, thixotropic agents, plasticisers, colouring additives and adhesion promoters, furthermore solvents and/or reactive diluents.

As thixotropic agents there can be used customary thixotropy-imparting rheology aids, such as pyrogenic silica, bentonite, alkyl and methyl celluloses, castor oil derivatives or the like. They can be added, for example, in a proportion by weight of from 0.01 to 50% by weight, especially from 0.5 to 20% by weight, for example from 0.1 to 5% by weight.

As fillers there can be used customary fillers having a fine average particle size (for example average particle size d50 of 50 µm or less, especially 40 µm or less, preferably 30 µm or less, advantageously 25 µm or less, for example preferably 20 µm or less, very preferably 10 µm or less, especially 5 µm or less, most especially 1 µm or less) or a relatively large average particle size, especially chalks, sand, quartz sand, quartz powder, stone dusts, glass, porcelain, corundum, ceramics, silicates, clays, barite, aluminium hydroxide, calcium carbonate or the like, which can be added in the form of powders, in granular form or in the form of shaped bodies, or other fillers, such as kernel or shell flours obtained from plants, which increases the biogenic carbon content, such as olive stone flour, coconut shell flour or furthermore walnut shell flour, or also hydraulic fillers, such as gypsum, burnt lime or cement (for example alumina cement or Portland cement), water glasses or active aluminium hydroxides, or mixtures of two or more thereof, it being possible for the fillers furthermore or especially also to be silanised. The fillers can be present in one or more components of a multi-component synthetic resin system according to the invention, for example in one or both components of a corresponding two-component kit; the proportion of fillers is preferably from 0 to 90% by weight, for example from 10 to 70% by weight (casing material broken during the installation of anchoring elements (for example splintered glass or splintered plastics), for example fragments of capsules, also can be counted as filler or, preferably, is counted as filler).

The d50 average particle size is defined as the particle size at which 50% of the particles by weight are smaller than the stated d50 particle size. There are various and technically generally recognised methods for determining the d50, for example by means of particle size distribution curve analyses customarily using sieves or, for example, (especially in the case of relatively small particles of less than 1 µm diameter) by means of laser granulometry. In the case of commercially available fillers, where applicable the average particle size corresponds to manufacturers' data.

Adhesion promoters that come into consideration are silane coupling agents having functional groups such as mercapto, epoxy, vinyl or halogen, such as γ-ureidopropyltrimethoxysilane, N-vinylbenzyl-γ-aminopropyltriethoxysilane, γ-mercaptopropyltrimethoxysilane, γ-mercapto-propyl-triethoxysilane, γ-mercaptopropylmethyldimethoxysilane, γ-mercaptopropylmethyl-dimethoxysilane, γ-glycidyloxypropyltrimethoxysilane, γ-glycidylpropyltriethoxysilane, γ-glycidyloxypropylmethyldimethoxysilane, β3-(3,4-epoxycyclohexyl)ethyltrimethoxysilane, β3-(3,4-epoxycyclohexyl)ethyltriethoxysilanes, vinyltrimethoxysilane, vinyltriethoxysilane, γ-acryloyloxypropylmethyltriethoxysilane, γ-chloropropyltrimethoxysilane, or the like; modified derivatives thereof, such as silylated polyesters, or a mixture of two or more thereof.

Further additives can also be added, such as plasticisers, non-reactive diluents, flexibilisers, stabilisers, rheology aids, wetting and dispersing agents, colouring additives, such as dyes or especially pigments, for example for staining the components different colours for better monitoring of their intermixing, or the like, or a mixture of two or more thereof. Such further additives can preferably be added in total in proportions by weight of in total from 0 to 90%, for example from 0 to 40% by weight.

The following groups come into consideration as non-reactive diluents: alcohols, such as 2-propanol, 2,2-dim-ethyl-4-hydroxymethyl-1,3-dioxolan, 1,2-propanediol, 1,4-butanediol, ethylene glycol, hexylene glycol ethoxylated bisphenol A, such as the Dianols from the Seppic company; polyols, such as polyether polyols and/or polyester polyols, such as the Voranols from the Dow Chemical Company; esters, such as tris(2-ethylhexyl)-O-acetylcitrate, triethyl citrate, acetyltributyl citrate, glycerol triacetate, isodecyl benzoate, 2,2,4-trimethyl-1,3-pentanediol diisobutyrate, DBE—dibasic esters, 1,2-cyclohexanedicarboxylic acid diisononyl ester (Hexamoll DINCH); Dowanols, such as Dowanol PMA, Dowanol TPM; phthalates, such as bis(2-propylheptal)phthalate, terephthalic acid dibutyl ester, di(iso)pentyl terephthalate, dioctyl terephthalate; hydrocarbon liquid resins from the Ruttgers company, such as Novares L100, Novares LA types, Novares LC20, Novares LS500, Novares LR600, Novares LP400, Ruetasolv DI and Ruetasolv MP; silane-terminated polyethers, such as Geniosil STP-E10, -15, -30, -35, Geniosil XB502, Geniosil XM 20; silane-terminated prepolymers (SPUR—silane-terminated polyurethanes), such as Desmoseal S XP 2636, -2749, -2774, -2821.

A biogenic non-reactive diluent that is liquid as such at application temperature is especially to be understood as one which as such (in unmixed form) occurs in liquid form at room temperature or in the range of from 0 to 30° C. Such a diluent is especially a vegetable oil, such as castor oil, linseed oil, epoxidised linseed oil or corresponding hydroxylated and hydroxyalkylated oils (for example polyether polyester polyols or polyester polyols, such as corresponding Merginols® from Hobum Oleochemicals GmbH, Hamburg, Germany), soybean oil, epoxidised soybean oil or rapeseed oil, or furthermore fatty acid alkyl esters ("biodiesel"), such as fatty acid methyl esters, for example rapeseed methyl ester or soybean oil methyl ester. Castor oil is especially preferred.

Alternatively a different biogenic polyol, especially biogenic glycerol and/or biogenic 1,4-butanediol, especially of vegetable origin, can be used.

Non-reactive means that, under customary application conditions, no chemical reaction or only a negligible chemical reaction takes place between the liquid diluent and the reactive system, that is to say the polymerising constituents and the constituents initiating polymerisation.

All constituents of synthetic resin systems according to the invention are known, are obtainable by methods known per se (for example from the patent specifications cited as prior art at the beginning or, in respect of urethane acrylates, DE 4 111 828 A1), or are commercially available.

Alkyl preferably denotes a linear or singly or multiply branched, saturated (acyclic) hydrocarbon radical having up to 20 carbon atoms, for example $C_1$-$C_8$alkyl, especially C1-C4alkyl, such as especially methyl, ethyl, n-propyl, isopropyl, n-butyl, isobutyl, tert-butyl or the like. Where reference is made to $C_1$-$C_4$alkyl, the number 1-4 always relates to the alkyl group itself (and does not include adjacent parts of the molecule, such as, for example, -carbonyl or -carbonylmethyl).

Parameters ("material-specific properties"), insofar as they are described in the context of the present application, are determined in accordance with methods known to the person skilled in the art, especially as follows:

For pull-out tests using M12 threaded rods, the following procedure, in accordance with ETAG 001 PART 5, (Publisher DIBt, 2008), is carried out:

First of all, a hammer drill and a hammer drill bit are used to drill holes (diameter 14 mm; depth 60 mm) in a concrete test specimen (concrete type C20/25) lying in a horizontal position. The drilled holes are cleaned using a hand blower and a hand brush. The drilled holes are then filled two-thirds full with the particular hardenable composition for fixing purposes to be tested. A threaded rod is pushed into each drilled hole by hand. The excess mortar is removed using a trowel. After 24 hours at room temperature, the threaded rod is subjected to pulling until failure occurs, the failure load being measured.

The gel time of a 30 g mixture is determined in a plastics beaker at 23° C. by means of manual stirring. On reaching the gel point, the mixture, which was previously fluid, becomes highly viscous and gel-like, which becomes apparent inter alia by the formation of lumps. At that point the clock, which was started at the beginning of the test, is stopped. The gel time can be read off directly.

The onset/glass transition temperature (Tg) (an indirect measure inter alia of the thermal dimensional stability) is measured by means of dynamic differential calorimetry (DSC) in accordance with ISO 11357-2 (2013) using specimens cured for 24 h.

EXAMPLES

The Examples that follow serve to illustrate the invention but do not limit the scope thereof

TABLE 1

Constituents and abbreviations used

| Abbreviation | Item |
|---|---|
| RMA | Real Michael addition/C-Michael addition |
| M | Molecular weight in g/mol |
| F | Functionality |
| TMPTAcAc | Trimethylolpropane triacetoacetate |
| GTAcAc | Glycerol triacetoacetate; equivalent weight 123.5 g/mol acetoacetate |
| TCDDAcAc | Tricyclodecanedimethanol diacetoacetate; equivalent weight 199.7 g/mol |
| ISDAcAc | Isosorbide diacetoacetate; equivalent weight 176.6 g/mol acetoacetate |
| EGDAcAc | ethyleneglycol diacetoacetate; equivalent weight 122 g/mol acetoacetate |
| TMPTA | Trimethylolpropane triacrylate |
| CN104 | Epoxyacrylate; M = 1000, F = 2; (Sartomer) |
| CN110 | Modified epoxyacrylate; M = 1000, F = 2; (Sartomer) |
| CN2303 | Hyperbranched polyester acrylate; M = 1400, F = 6; (Sartomer) |
| CN9210 | Aliphatic urethane acrylate; M = 1500, F = 6; (Sartomer) |
| CN925 | Modified aliphatic urethane acrylate; M = 2500, F = 4; (Sartomer) |
| CN9165A | Aromatic urethane acrylate; M = 900, F = 4; (Sartomer) |
| SR238 | 1,6-Hexanediol diacrylate |
| TMG | N,N,N',N'-Tetramethylguanidine |

TABLE 1-continued

Constituents and abbreviations used

| Abbreviation | Item |
|---|---|
| DBU | Diazabicycloundecene |
| NaOH | Saturated NaOH solution |
| RD20 | ipox RD20; Trimethylolpropane triglycidyl ether (ipox chemicals) |
| TETA | Triethylenetetraamine (Huntsman Corporation) |
| 10P | Palatinol 10 P; bis(2-propylheptyl)phthalate; (BASF) |
| Minex-10 | Micronized functional filler produced from nepheline syenite, a natural silica deficient sodium-potassium alumina silicate (The Cary Company, Illinois, USA) |

Example 1

Compositions and Pull-Out Tests from Concrete of Synthetic Resin Systems According to the Invention Setting tests are carried out in accordance with the afore-mentioned methods for determining parameters for "pull-out tests from concrete". Table 2 shows the constituents used and the bond stresses determined.

TABLE 2

Formulations of the setting tests and bond stresses determined

| Item | B1.1 | B1.2 | B1.3 | B1.4 | B1.5 |
|---|---|---|---|---|---|
| TMPTAcAc [g] | 4.59 | | | | |
| GTAcAc [g] | | 4.77 | | | |
| TCDDAcAc [g] | | | 6.21 | | |
| ISDAcAc [g] | | | | 5.85 | |
| EGDAcAc [g] | | | | | 4.74 |
| TMPTA [g] | 7.82 | 7.65 | 6.21 | 6.57 | 7.67 |
| TMG [g] | 0.09 | 0.09 | 0.09 | 0.09 | 0.09 |
| Minex-10 [g] | 12.50 | 12.50 | 12.50 | 12.50 | 12.50 |
| Bond stress [N/mm$^2$] | 31.0 | 30.2 | 31.2 | 30.8 | 29.3 |

The bond stresses listed in Table 2 demonstrate that the known real Michael addition (in short: RMA or C-Michael addition) known from the field of (floor) coatings is also entirely suitable for use as a synthetic resin system for chemical fixing technology. Table 2 also shows that an extremely wide range of compounds carrying CH-acidic methylene groups can be used without suffering any significant loss of performance. Of special interest in this connection is ISDAcAc, which is an acetoacetate based on renewable raw materials, that is to say has a BioC content.

Example 2

Compositions and Pull-Out Tests from Concrete with Different TMPTA Ratios

In order to demonstrate the robustness of the synthetic resin system according to the invention, setting tests, in accordance with the afore-mentioned methods for determination of parameters, are carried out with different TMPTA ratios (±from the optimum mixing ratio).

TABLE 3

Formulations of the B148 screening and bond stresses determined

| Item | B2.1 | B2.2 | B2.3 | B2.4 | B2.5 | B2.6 | B2.7 |
|---|---|---|---|---|---|---|---|
| TMPTAcAc [g] | 4.64 | 4.62 | 4.60 | 4.59 | 4.58 | 4.57 | 4.55 |
| TMPTA [g] | 7.65 | 7.73 | 7.78 | 7.82 | 7.86 | 7.91 | 7.99 |
| TMG [g] | 0.09 | 0.09 | 0.09 | 0.09 | 0.09 | 0.09 | 0.09 |
| Minex-10 [g] | 12.63 | 12.56 | 12.53 | 12.50 | 12.47 | 12.44 | 12.38 |
| Bond stress [N/mm$^2$] | 31.6 | 31.1 | 31.2 | 30.4 | 28.4 | 28.2 | 29.5 |
| Crosslinking index | 3.9 | 3.9 | 3.9 | 3.9 | 3.9 | 3.9 | 3.9 |

It will be apparent from Table 3 that despite departing from the optimum mixing ratio (B2.4—determined with DSC in accordance with ISO 11357-2 (2013)) the bond stress remains relatively constant.

Example 3

Compositions and Pull-Out Tests using Different Catalysts and Screening Catalyst Content Table 4 below shows the constituents used and the bond stresses determined of synthetic resin systems according to the invention in which the nature and the amount of catalysts used are varied.

TABLE 4

Formulations of the setting tests and bond stresses determined

| Item | B3.1 | B3.2 | B3.3 | B3.4 | B3.5 | B3.6 |
|---|---|---|---|---|---|---|
| TMPTAcAc [g] | 4.59 | 4.59 | 4.59 | 4.60 | 4.61 | 4.58 |
| TMPTA [g] | 7.82 | 7.82 | 7.82 | 7.84 | 7.85 | 7.80 |
| DBU [g] | 0.09 | | | | | |
| NaOH [g] | | 0.09 | | | | |
| TMG [g] | | | 0.09 | 0.06 | 0.04 | 0.12 |
| Minex-10 [g] | 12.50 | 12.50 | 12.50 | 12.50 | 12.50 | 12.50 |
| Bond stress [N/mm$^2$] | 30.4 | 30.6 | 31.0 | 29.7 | 26.8 | 32.2 |
| Gel time [mm:ss] | | | 03:20 | 12:40 | 17:20 | 01:35 |

Table 4 makes it clear that all strongly basic compounds can be used as catalysts for the synthetic resin systems according to the invention. Table 4 also shows that the gel time can be varied or adjusted to a desired gel time by means of the amount of catalyst used. Moreover, Table 4 makes it clear that using the synthetic resin systems according to the invention it is possible to combine the advantages of the systems previously used—in chemical fixing technology: rapid curing as in the case of free-radical-hardening systems and the high bond stresses of epoxy systems. This is demonstrated by the gel times and bond stresses determined.

Example 4

Compositions and Pull-Out Tests at Low Temperatures and Reference Tests

In order once again to underline the tremendous performance of the synthetic resin systems according to the invention, pull-out tests at −5° C. and reference tests are carried out and the following bond stresses determined.

TABLE 5

Bond stress of synthetic resin systems according to the invention at −5° C./48 h and reference tests

| Item | B3.6 (RT) | B4.2 (−5° C./48 h) | FIS EM (−5° C./48 h) | Ref1 (RT) | Ref2 (RT) |
|---|---|---|---|---|---|
| TMPTAcAc [g] | 4.58 | 4.58 | | | |
| TMPTA [g] | 7.80 | 7.80 | | 9.96 | |
| RD20 [g] | | | | | 10.57 |
| TETA [g] | | | | 2.46 | 1.84 |
| TMG [g] | 0.12 | 0.12 | | 0.10 | 0.10 |
| Minex-10 [g] | 12.50 | 12.50 | | 12.50 | 12.50 |
| Bond stress [N/mm$^2$] | 32.2 | 33.8 | 7.0 | 21.0 | 16.2 |

It will be apparent from Table 5 that neither reference test Ref1 (acrylate-amine/N-Michael addition) nor reference test Ref2 (classic epoxide—amine reaction) achieves the high bond stresses of the synthetic resin systems according to the invention, despite a similar chemical structure of the starting materials and functionalities. The tremendous performance of synthetic resins according to the invention is again illustrated in Example 4.2. After only 48 h curing at −5° C., the performance achieved is already the same as that after 24 h curing at room temperature (B3.6), whereas FIS EM 390 S® (a successful, commercially well-established example of a two-component injection mortar system for mortar-bonded fixing of anchoring elements based on an epoxy/amine reaction [fischerwerke GmbH & Co. KG, Waldachtal, Germany]) has still not fully cured.

Example 5

Compositions and Pull-Out Tests after Different Curing Times

As mentioned at the beginning, the inventors have ascertained that using the synthetic resin systems according to the invention it is possible to combine the advantages of the commercially available chemical fixing systems. This is again illustrated in Table 6 below.

TABLE 6

Bond stress after different curing times

| | Bond stress [N/mm$^2$] |
|---|---|
| 1 h | 31.0 |
| 24 h | 32.3 |
| 7 d | 33.0 |

The constituents and amounts used here can be found in formulation B3.3. Table 6 shows that the synthetic resin systems according to the invention—as free-radical-hardening systems—are already virtually fully cured after 1 h, but the bond stresses tend to be in the region of the epoxy systems.

Example 6

Acrylate Mixtures and Bond Stresses Determined

Table 7 below shows mixtures of different acrylates and the bond stresses thereof determined in a pull-out test, and the onset/glass transition temperatures thereof.

TABLE 7

Acrylate mixtures

| Item | B6.1 | B6.2 | B6.3 | B6.4 | B6.5 | B6.6 | FIS EM |
|---|---|---|---|---|---|---|---|
| TMPTAcAc [g] | 4.35 | 4.32 | 4.52 | 4.49 | 4.29 | 4.53 | |
| TMPTA [g] | 6.05 | 6.07 | 5.92 | 5.94 | 6.09 | 5.91 | |
| CN104 [g] | 2.02 | | | | | | |
| CN110 [g] | | 2.02 | | | | | |
| CN2303 [g] | | | 1.97 | | | | |
| CN9210 [g] | | | | 1.98 | | | |
| CN925 [g] | | | | | 2.03 | | |
| CN9165A [g] | | | | | | 1.97 | |
| TMG [g] | 0.08 | 0.08 | 0.09 | 0.09 | 0.08 | 0.09 | |
| Minex-10 [g] | 12.50 | 12.50 | 12.50 | 12.50 | 12.50 | 12.50 | |
| Bond stress [N/mm$^2$] | 33.9 | 33.7 | 28.7 | 30.5 | 27.6 | 34.1 | |
| Crosslinking index | 3.9 | 3.9 | 4.2 | 4.2 | 4.0 | 4.1 | |
| 1st run: onset 24 h [° C.] | 50.1 | 48.4 | 53.4 | 54.0 | 53.5 | 55.8 | 51.6 |
| 2nd run: Tg 24 h [° C.] | 99.2 | 101.2 | 96.4 | 115.6 | 106.7 | 114.4 | 82.9 |

Table 7 demonstrates that all acrylates can be used in the synthetic resin systems according to the invention. The onset/glass transition temperature listed, which is a measure of the thermal dimensional stability of the particular system, shows that the synthetic resin systems according to the invention are suitable for use under building site conditions (where high temperatures may occur, depending upon the weather conditions) and even surpass the injection mortar FIS EM 390 S® in the second run.

Example 7

Compositions and Pull-Out Tests with Different Crosslinking Indices

The inventors have also discovered that to achieve the present objective (to combine the advantages of the commercially available fixing systems) the synthetic resin systems according to the invention should have a certain crosslinking index. This differs markedly from the crosslinking indices used for (floor) coatings from the prior art. Table 8 below will illustrate this.

TABLE 8

Bond stresses of different crosslinking indices

| Item | B7.1 | B7.2 | B7.3 | B7.4 | B7.5 | B7.6 | B7.7 | B7.8 | B7.9 |
|---|---|---|---|---|---|---|---|---|---|
| SR238 [g] | 7.00 | 7.00 | 5.98 | 3.50 | 7.00 | | 3.50 | | |
| TMPTA [g] | | | | 3.50 | | 7.00 | 3.50 | 5.22 | 7.00 |
| ISDAcAc [g] | 5.47 | | 2.00 | 5.87 | | 6.26 | | 2.00 | |
| TCDDAcAc [g] | | 6.19 | | | | | | | |
| TMPTAcAc [g] | | | 2.00 | | 4.09 | | 4.39 | 2.00 | 4.68 |
| TMG [g] | 0.09 | 0.09 | 0.07 | 0.09 | 0.08 | 0.09 | 0.08 | 0.06 | 0.08 |
| Minex-10 [g] | 12.56 | 13.28 | 10.05 | 12.96 | 11.17 | 13.36 | 11.46 | 9.29 | 11.76 |
| Bond stress [N/mm$^2$] | 7.0 | 15.2 | 19.0 | 22.8 | 23.2 | 25.7 | 31.2 | 31.3 | 31.5 |
| Crosslinking index | 2.7 | 2.7 | 2.9 | 3.0 | 3.0 | 3.4 | 3.5 | 3.7 | 4.0 |
| 1st run: Tg 24 h [° C.] | 27.2 | 14.5 | 24.5 | 43.2 | 29.2 | 41.3 | 51.8 | 54.9 | 53.3 |
| 2nd run: Tg 24 h [° C.] | 34.1 | 20.3 | 30.4 | 58.2 | 35.4 | 83.9 | 72.1 | 100.5 | 110.0 |

It will be evident from Table 8 that the bond stress increases as the crosslinking index of the synthetic resins according to the invention increases. Table 8 also shows that the glass transition temperature (a characteristic value important for a fixing system, because it is an indirect measure of the thermal dimensional stability) likewise increases as the crosslinking index increases. For this reason the synthetic resins according to the invention should have a crosslinking index ≥3.

Example 8

Cartridge Formulation for Pull-Out Tests

The constituents listed in Table 9 are introduced into a 150 ml cartridge with a volume ratio of 7:1 and subjected to a setting test in accordance with the afore-mentioned methods for determining parameters for "pull-out tests from concrete". Component A is introduced into the larger part by volume.

TABLE 9

Cartridge formulation

| | Component A |
|---|---|
| TMPTAcAc [% by weight] | 18.27 |
| TMPTA [% by weight] | 31.11 |
| Filler [% by weight] | 49.38 |
| Additive [% by weight] | 1.23 |

| | Component B |
|---|---|
| 10P [% by weight] | 23.95 |
| TMG [% by weight] | 3.19 |
| Minex-10 [% by weight] | 70.86 |
| Additive [% by weight] | 2.00 |

The bond stress determined is 28 N/mm2.

The invention claimed is:

1. A method for fixing of an anchoring element in a hole or crevice in a building substrate, comprising introducing a synthetic resin system as an adhesive in the form of a two-component kit as a cartridge or a foil pouch, each having two chambers, wherein the synthetic resin system includes a) a reaction resin based on α, β-unsaturated compounds, b) a reaction resin based on compounds that include CH-acidic methylene groups, and c) a catalyst;
said method further comprising introducing the synthetic resin system and an anchoring element one after the other or substantially simultaneously into said hole or crevice,
wherein the synthetic resin is a Michael-addition-hardening and wherein the catalyst is selected from the group consisting of alkali metal hydroxides, alkali metal alkoxides, quaternary ammonium compounds, tertiary amines, guanidines, amidines; phosphine catalysts; and catalysts in the form of mixtures of an epoxide with one or more tertiary amines, it being possible for salts of strong bases or small amounts of the strong bases themselves additionally to be added;
or a mixture of two or more of the catalysts.

2. The method according to claim 1, wherein the reaction resin that carries one or more CH-acidic methylene groups is one comprising malonic acid or a malonic acid ester selected from the group consisting of malonic acid dimethyl ester, malonic acid diethyl ester, malonic acid di-n-propyl ester, malonic acid diisopropyl ester, malonic acid dibutyl ester, malonic acid di-(2-ethylhexyl) ester and malonic acid dilauryl ester, cyanoacetic acid esters,-selected from the group consisting of 2-ethylhexyl cyanoacetate, butyl cyanoacetate, octyl cyanoacetate and 2-methoxyethyl cyanoacetate, a dione selected from the group consisting of pentane-2,4-dione, hexane-2,4-dione, heptane-2,4-dione, 1-methoxy-2,4-pentanedione, 1-phenyl-1,3-butane-dione, 1,3-diphenyl-1,3-propanedione, 4,6-dioxoheptanoic acid methyl ester and 5,7-dioxooctanoic acid methyl ester, an acetoacetate, selected from the group consisting of benzoylacetoacetic acid methyl, ethyl or butyl ester, propionylacetic acid methyl, ethyl or butyl ester, butyroylacetic acid methyl ester, acetoacetic acid methyl, ethyl, isopropyl, n-butyl, isobutyl or tert-butyl ester, acetoacetic acid (2-methoxyethyl) ester, acetoacetic acid (2-ethylhexyl) ester, acetoacetic acid lauryl ester, 2-acetoacetatoethyl acrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, free or ethoxylated bisphenol-A-,-F-,-AF-or—S-diacetoacetate, trimethylolpropane triacetoacetate, pentaerythritol tri-or tetra-acetoacetate, ditrimethylolpropane tetraacetoacetate, dipentaerythritol hexaacetoacetate, an acetoacetate-group-carrying oligomer or polymer which is obtainable by transesterification of acetoacetic acid esters, an acetoacetate-group-carrying oligomer or polymer which is obtainable by copolymerisation of acetoacetoxyethyl methacrylate, an oligomer or polymer which is obtainable from dialkyl malonates and diols, or an acetoacetylated novolak, or a mixture of two or more thereof.

3. The method according to claim 2, wherein the reaction resin based on compounds that include CH-acidic methylene groups is an acetoacetate.

4. The method according to claim 3, wherein the reaction resin based on compounds that include CH-acidic methylene groups is a mixture of a diacetoacetate and a trisacetoacetate.

5. The method according to claim 1, wherein the reaction resin based on α,β-unsaturated compounds has an average functionality ≥2 and the reaction resin based on compounds that include CH-acidic methylene groups has an average functionality ≥4.

6. The method according to claim 1, wherein the reaction resin based on α,β-unsaturated compounds has a crosslinking index ≥3.

7. The method according to claim 1, wherein the synthetic resin system is in the form of a multi-component system.

8. The method according to claim 1, wherein the reaction resin based on α,β-unsaturated compounds has a crosslinking index ≥3.5.

9. The method according to claim 1, wherein the reaction resin is in the form of a two-component kit, wherein
 (i) the reaction resin based on α, β-unsaturated compounds and the reaction resin based on compounds that include CH-acidic methylene groups are present in one component (K1), while the catalyst is present on its own or together with a non-reactive solvent/diluent/plasticiser and/or adhesion promoter in a different component (K2) (which component is not capable of mixing, that is to say is kept separate, in the stored state); or
 (ii) constituents a), b) and an epoxy moiety of an epoxy/tert-amine catalyst are present in one component, and constituent c) is present together with a tert-amine moiety of an epoxy/tert-amine catalyst in the other component, it being optionally possible in each case for one or more further additional ingredients to be present.

10. The method according to claim 1, wherein the reaction resin based on α, β-unsaturated compounds is a reaction resin which comprises or consists of an α,β-unsaturated compound that carries at least one fumarate, maleate, itaconate or acrylate group or two or more thereof, selected from the group consisting of $C_2$-$C_{10}$alkyl-acrylate, ethanediol diacrylate, 1,3-propanediol diacrylate, 1,4-butanediol acrylate, poly(butanediol) diacrylate, polybutadiene diacrylate, 3-methyl-1,5-pentanediol diacrylate, 1,6-hexanediol diacrylate, diethyleneglycol diacrylate, tetraethyleneglycol diacrylate, tripropyleneglycol diacrylate, triethyleneglycol diacrylate, triisopropyleneglycol diacrylate, dipropyleneglycol diacrylate, neopentylglycol diacrylate, ethoxylated or propoxylated neopentylglycol diacrylate, tripropyleneglycol diacrylate, bisphenol-A-, bisphenol-F-, bisphenol-AF-or bisphenol-S-diglycidyl ether diacrylate, bisphenol-A-polyethoxydiacrylates, bisphenol-F-polyethoxydiacrylates, polyethyleneglycol diacrylates, polypropyleneglycol diacrylates, trimethylolpropane triacrylate, di-trimethylol-propane tetraacrylate, trimethylolpropane polyethoxytriacrylate, ethoxylated or propoxylated trimethylolpropane triacrylate, glycerol triacrylate, ethoxylated or propoxylated glycerol triacrylate, tris(2-acryloxyethyl) isocyanurate, pentaerythritol triacrylate, pentaerythritol monohydroxytriacrylate, pentaerythritol triethoxy-triacrylate, pentaerythritol tetraacrylate, ethoxylated or propoxylated pentaerythritol tetraacrylate, ditrimethylolpropane tetraacrylate, dipentaerythritol pentaacrylate, dipentaerythritol polyhexanolide hexaacrylate, dipentaerythritol hexaacrylate, tris(hydroxyethyl) isocyanuratopolyhexanolide triacrylate, tris(2-hydroxyethyl)-isocyanuratotriacrylate, tricyclodecanedimethylol diacrylate, esterdiol diacrylate, 2-(2-acryloyloxy-1,1-dimethyl)-5-ethyl-5-acryloyloxymethyl-1,3-dioxane, tetrabromo-bisphenol-A-diethoxydiacrylate,4,4-dimercaptodiphenylsulfide diacrylate, polytetra-ethyleneglycol diacrylate, 1,9-nonanediol diacrylate, 1,10-decanediol diacrylate, dimethylolpropane tetraacrylate, cresol epoxyacrylates, novolak "poly" acrylate, acrylate-group-containing oligomers or polymers from the reaction of polyepoxides with acrylic acid or reactive derivatives thereof or from the reaction of polyester polyols with acrylic acid or reactive derivatives thereof, and urethane acrylates obtainable, by reaction of isocyanates with an OH-group-containing acrylate, and polyester acrylate resins); an acrylic-functional alkoxysilane or organopolysiloxane selected from the group consisting of acrylato-methyl-trimethoxysilane,-methyldimethoxy-silane,-dimethylmethoxysilane,-triethoxysilane or—methyldiethoxysilane, acrylamidomethyl-trimethoxysilane,-methyldimethoxysilane,-dimethylmethoxy-silane,-triethoxysilane, and—methyldiethoxysilane,-methyl-dimethyl-ethoxysilane;
 or a polyester resin based on maleic, fumaric or itaconic acid or a respective anhydride thereof;
 or a polyester, polyurethane, polyether and/or alkyd resin that carries activated, ethylenically unsaturated groups;
 or an α,β-unsaturated compound having biogenic content having biogenic acrylate content of hydroxy-group-containing vegetable oils, a wholly or at least partly biogenic alkan(mono-, di-, tri-, tetra-, penta-or hexa-or poly-) ol acrylate, a partly or wholly biogenic polyglycerol acrylate, a wholly or partly biogenic acrylate of one or more sugar alcohols, a wholly or partly biogenic acrylated fusel oil, a wholly or partly biogenic 5-or 6-membered-ring heterocyclyl acrylate (having one or two hetero atoms selected from O, N and S in the ring, or a partly or wholly biogenic glycerol or polyglycerol acrylate, or a wholly or partly biogenic saccharide acrylate; or the corresponding methacrylates;
 or a mixture of two or more of the mentioned α, β-unsaturated compounds.

11. The method according to claim 1, wherein the reaction resin includes a catalyst or two or more thereof, wherein the phosphine catalyst is selected from the group consisting of tricyclohexylphosphine, tricyclopentylphosphine, tri-n-hexyl-phosphine, tris(2,4,4-trimethylpentyl)phosphine, tris (2-ethylhexyl)phosphine, tri-n-octylphosphine, tri-n-decylphosphine, tri-n-dodecylphosphine, tristearylphosphine and triphenylphosphine.

12. The method according to claim 1, wherein the reaction resin-comprises one or more further additives selected from the group consisting of fillers, rheology aids, thixotropic agents, plasticisers, colouring additives, adhesion promoters, solvents and reactive diluents.

13. A method for mortar-bonded fixing of anchoring elements in holes or crevices according to claim 1, wherein the building substrate is masonry or concrete, the term concrete also including cracked concrete.

* * * * *